United States Patent [19]

Pieterse et al.

[11] Patent Number: 5,268,415
[45] Date of Patent: Dec. 7, 1993

[54] THIN SELF-SUPPORTING INORGANIC GREEN COMPACTS AND PROCESS FOR THE PREPARATION OF SUCH GREEN COMPACTS

[75] Inventors: Jan K. Pieterse, Weert; Cornelis W. M. Bastiaansen, Geleen; Frans Heffels, Born; Willibrordus M. G. F. Pontenagel, Onderbanken, all of Netherlands

[73] Assignee: Stamicarbon B.V., Netherlands

[21] Appl. No.: 635,130

[22] PCT Filed: Jul. 16, 1990

[86] PCT No.: PCT/NL90/00096
§ 371 Date: Mar. 19, 1991
§ 102(e) Date: Mar. 19, 1991

[87] PCT Pub. No.: WO91/01346
PCT Pub. Date: Feb. 7, 1991

[30] Foreign Application Priority Data

Jul. 20, 1989 [NL] Netherlands .................. 8901872

[51] Int. Cl.$^5$ .............. C08L 29/04; C08L 33/20; C08L 23/02; C04B 35/64
[52] U.S. Cl. .................. 524/557; 524/565; 524/582; 524/585; 524/586; 264/63; 264/166; 264/290.5
[58] Field of Search .............. 264/63, 166, 290.5; 524/413, 430, 557, 582, 585, 586, 565

[56] References Cited

U.S. PATENT DOCUMENTS

| | | | |
|---|---|---|---|
| 3,189,978 | 6/1965 | Stetson | 264/61 |
| 3,536,508 | 10/1970 | Short | 106/174 |
| 3,988,524 | 10/1976 | Dreyer et al. | 524/406 |
| 4,411,854 | 10/1983 | Maurer et al. | 524/585 |
| 4,734,237 | 3/1988 | Fanelli et al. | 264/328.2 |
| 4,752,857 | 1/1988 | Khoury et al. | 264/66 |
| 4,765,950 | 8/1988 | Johnson | 264/63 |
| 4,814,370 | 3/1989 | Kramer et al. | 524/413 |
| 4,882,110 | 11/1989 | Kramer et al. | 524/413 |
| 4,900,698 | 2/1990 | Lundsager | 264/63 |
| 4,921,652 | 1/1990 | Tsuji et al. | 264/41 |
| 5,064,596 | 11/1991 | Chida et al. | 264/63 |
| 5,069,839 | 12/1991 | Grote et al. | 264/166 |

FOREIGN PATENT DOCUMENTS

0210874 2/1987 European Pat. Off.

Primary Examiner—Paul R. Michl
Assistant Examiner—Peter Szekely
Attorney, Agent, or Firm—Cushman, Darby & Cushman

[57] ABSTRACT

Thin self-supporting green compact, less than 25μ thick, containing an inorganic substance and as a binder a polymer with a weight average molecular weight of more than 400,000, which polymer in a suitable solvent can form a thermoreversible gel above room temperature, the volume fraction of the inorganic substance being more than 45% relative to the total amount of binder plus inorganic substance and a process to prepare such green compacts.

20 Claims, No Drawings

THIN SELF-SUPPORTING INORGANIC GREEN COMPACTS AND PROCESS FOR THE PREPARATION OF SUCH GREEN COMPACTS

The invention relates to a thin self-supporting inorganic green compact which contains an inorganic substance and a binder and is less than 25 μm thick.

Such inorganic green compacts are described in EP-A-0210874.

A drawback of the green compacts described in said patent, in this case films, is that cellulose is used as binder, which limits the stretchability of the green compacts. Because this means that the desired extremely thin films have to be produced in one go. The films are produced by first applying a thin layer of the solution containing binder and inorganic substance to a support, drying it and then separating the layer from the support. Such a process imposes very high intrinsic requirements on the equipment to be used to produce the films because irregularities in thickness or cracks easily occur. For the same reason such processes are extremely sensitive to the occurrence in the added inorganic substance of particles with dimensions similar to the layer thickness. In practice, it therefore appears to be hardly possible to produce very thin-walled objects without cracks in this manner, tests having shown that it is very difficult to remove the films from the support, in particular in the case of thin films (10–20μ). Moreover, cellulose is sensitive to moisture, as a result of which the dimensional stability is adversely affected, which precludes specific applications. In the framework of the invention reference is made to a green compact as long as the organic binder is still present as such and has not yet been removed or converted.

The aim of the invention is to provide thin green compacts of an inorganic substance bound with an organic binder which do not have the aforementioned drawbacks.

The green compacts according to the invention are characterized in that the binder consists substantially of a polymer with a weight average molecular weight of more than 400,000, which polymer, incorporated in a suitable solvent, forms a thermoreversible gelling system with gel and dissolution points above room temperature, the volume fraction of the inorganic substance being more than 45% relative to the total amount of binder and inorganic substance.

Such green compacts are easily obtainable without having to impose particularly high requirements on the equipment to be used. Moreover, it is possible to use said green compacts to apply inorganic layers, whether or not sintered, in objects. An example of such an object is a multilayer ceramic capacitor, in the case of which a low ceramic layer thickness is a great advantage with respect to the miniaturisation aimed at in this application.

The invention therefore also relates to a process for the preparation of said green compacts and the use of the green compacts according to the invention in the application in objects of layers containing inorganic substance.

DE-A-2334704 describes the preparation of fibres of polyethylene oxide in which substantial amounts of fillers can be incorporated. The polymer-solvent system described in said patent is a high-viscosity solution at room temperature, which causes problems with respect to the feeding of the extruder. Another drawback of the polyethylene oxide/water system used is that this system does not form a gelling system until it is cooled to below room temperature. At room temperature the product obtained therefore remains tacky as long as it contains solvent. Consequently, the solvent has to be removed to enable further processing. This is a particular drawback because the solvent has to be removed from the unstretched and thus thicker green compact, which is more difficult and takes longer.

Thermoreversible gelling systems are in the scope of the invention understood to be systems characterized by the fact that the conversion into a gel of a polymer dissolved in a solvent is effected by means of a (rapid) drop in temperature. Examples of thermoreversible gelling systems with gel and dissolution points above room temperature are: polyalkenes with the usual solvents such as paraffins, toluene, xylene, tetrahydronaphthalene (tetralin) or decahydronaphthalene (decalin); polyvinyl alcohol (PVAL) with ethylene glycol as solvent; polyacrylonitrile (PAN) with dimethylformamide as solvent, to which zinc chloride is added as complexing salt, in an amount of about 10 wt. % relative to the amount of PAN.

The green compact may have any simple shape obtainable via the usual continuous shaping methods, such as a fibre, film, or tube. The shape is not restricted to flat objects. Three-dimensional structures such as curved films or cylindrical shapes are also possible. If the green compact concerns fibres the thickness of the green compact is understood to be the diameter of the fibre.

The binder can be removed according to commonly known methods, such as pyrolysis, extraction or firing. Good results, particularly as regards dimensional stability, were obtained by removing the binder by means of low-temperature incineration with the aid of plasmas.

If so desired, the object may then be subjected to sintering, in which case the object is brought to a certain temperature for a certain amount of time, in a known manner. The conditions to be applied are known in the literature and depend on the inorganic substance used.

To obtain a continuous layer of inorganic material, the filler content must be as high as possible. In the case of the green compacts according to the invention the filler content is more than 45 vol. %, usually 50–99 vol. % inorganic substance relative to inorganic substance plus polymer binder. In some cases it may be useful to use an inorganic substance with a bimodal particle size distribution to obtain a high filler content.

By sintering the green compact after the removal of the binder a self-supporting, whether or not continuous, object can be obtained. As inorganic sinterable substances use may be made of all substances or mixtures that are sinterable per se or of inorganic substances that are not sinterable per se, to which suitable sintering additives are added, for example $SiO_2$, $O_3$, $BaTiO_3$, $Si_3N_4$ mixed with $Y_2O_3$ or SiC mixed with boron compounds.

The green compacts appear to be suitable for many applications. In some cases the green compact as such will meet the requirements, whereas in other cases the specific application will require a thin inorganic layer, which is obtained after the binder has been removed from the green compact, if so desired with subsequent sintering.

The following applications are illustrative as examples, but the list is not to be regarded as limitative.

If the inorganic substance has a high dielectric constant, thin dielectric layers can be obtained after firing and sintering, which are suitable for use in capacitors. In addition, thin conductive films can be produced, so that multilayer ceramic capacitors in particular present good possibilities for the use of the green compacts according to the invention.

In addition, it appeared possible to produce very thin substrata for hybrid electronic structures. Good results have been obtained in this field using $Al_2O_3$ as inorganic filler. An advantage of the green compact according to the invention in such applications is that the porosity of the green compact can be varied within wide limits to meet the demands involved in the various applications.

The green films are suitable as thin flexible envelopes of objects for better protection from the influence of high-energy electromagnetic radiation. Several metallic fillers can be considered for this purpose. The green compacts are also very suitable for use as coatings. Abrasion-resistant coatings can be applied to objects using, for example, carbides or nitrides, in which case the flexibility of the green compact appeared an advantage in particular in obtaining a good cover for complex shapes. It has been found that the green compact according to the invention has sufficiently high strength and modulus to be handled during the further processing. This is particularly the case if the modulus of elasticity of the green compact is at least 0.5 GPa.

The invention also relates to a process for the preparation of thin-walled inorganic green compacts. A process for the production of filled fibres of organic material is known from U.S. Pat. No. 4,411,854, in which process a high-molecular polyalkene with a weight average molecular weight of more than $4 \times 10^5$ dissolved in a suitable solvent with a binder content of less than 30 wt. %, relative to the binder plus solvent, is converted, at a temperate above the gelling temperature of the solution, into a fibrous, solvent-containing object, which object is rapidly cooled to below the gelling temperature and stretched. An additive was added to the fibres to improve the tensile strength and the modulus. It is advised to use less than 37.5% additive, relative to the amount of polymer plus filler.

It has now appeared possible to use the process according to the invention to produce green compacts containing very large amounts of inorganic substance, which are dimensionally stable and stretchable and contain little binder relative to the amount of inorganic substance. In this manner a thin, continuous inorganic object can be obtained after the removal of the polymer binder and, optionally, sintering. Preferably, the green compact is stretched biaxially because it has been found, surprisingly, that the maximum possible draw ratio does not decrease when the green compact is stretched biaxially. This is particularly surprising because the maximum draw ratio does decrease with an increasing filler content in the case of uniaxial stretching. Another advantage is that the thickness of the green compact decreases rapidly in biaxial stretching, which means that thin stretched green compacts can be easily obtained.

Preferably, use is made of a polymer with the highest possible molecular weight. For it has been found that if the molecular weight is high, the concentration of polymer in solution may be low and will nevertheless, after shaping, result in a coherent stretchable and dimensionally stable structure. It is important to use the lowest possible concentration of polymer binder in solution because then a higher inorganic substance/polymer binder volumetric ratio can be obtained after the removal of the solvent. This is because the allowable amount of inorganic substance is determined by the closest concentration of the particles in the solution. For spherical particles of uniform size the theoretical maximum amount of inorganic substance is thus 60 vol. % relative to inorganic substance plus polymer solution. In practice, use will generally be made of amounts of inorganic substance of between 20 and 40 vol. % in the solution.

The filler content w of the green compact is defined as:

$$3 = V_i/(V_i + V_p) \tag{1}$$

The maximum possible filler content of the green compact ($w_{max}$) is related to the filler content of the solution (a) according to the equation:

$$w_{max}(a) = a/(a + M_{emelt}/M_n) \tag{2}$$

These quantities are defined as follows:
$a = V_i/(V_i + V_p + V_s)$, the filler content of the solution;
$V_p, V_i, V_s$ = the volume of the polymer, inorganic substance and solvent, respectively;
$M_{emelt}$ = the molecular weight of the polymer between two cross-links in the equilibrium melt (g/mole)
$M_n$ = the number average molecular weight of the polymer (g/mole).

$M_{emelt}$ can be determined according to the method described in Advances in Polymer Science, 1974, part 16, Chapter 7. The $M_{emelt}$ to be determined for polyethylene in this manner is 4000. $M_n$ can be determined according to the usual methods, for example GPC. The polydispersity defined as the ratio of the weight average molecular weight and the number average molecular weight depends on the molecular weight distribution in the polymer and is between about 3 and 30 in the case of the aforementioned polymers. The maximum filler content of the green compact is determined by the maximum filler content of the solution, which, as already indicated above, is 0.6, according to equation (1):

$$w_{max}(0.6) = 0.6/(0.6 + M_{emelt}/M_n) \tag{3}$$

As an example, the values given in the $w_{max}(0.6)$ and $w_{max}(0.3)$ columns of Table 1 illustrate the ratios of the weight average molecular weight $M_w$, the number average molecular weight $M_n$ and the maximum possible filler content of the green compacts in the case of polyethylene, on the basis of a polydispersity of 12, for a solution filler content of 0.6 and 0.3, respectively.

TABLE 1

| $M_w$ [g/mole] | $M_n$ [g/mole] | $w_{max}$ (0.6) [—] | $w_{max}$ (0.3) [—] |
|---|---|---|---|
| 120,000 | 10,000 | 0.6 | 0.42 |
| 480,000 | 40,000 | 0.85 | 0.75 |
| 960,000 | 80,000 | 0.92 | 0.85 |
| 1,200,000 | 100,000 | 0.93 | 0.88 |
| 2,400,000 | 200,000 | 0.97 | 0.94 |
| 6,000,000 | 500,000 | 0.99 | 0.97 |

Preferably, use is made of the finest possible inorganic powder to obtain the smoothest possible surface. A good starting material can be obtained by suspending the inorganic powder in a suitable medium. The polymer solvent may be chosen as a suitable suspension medium. Surfactants may be added to stabilize the suspension. If so desired, the particle size can be reduced by subsequent grinding, for example in a pebble mill, or via an ultrasonic treatment.

Preferably, a volatile solvent is used. The use of non-volatile solvents is described in U.S. Pat. No. 3,926,851, where the solvent is removed via extraction. Such a process is not only time-consuming, but residual solvent and/or extracting liquid are always retained in the end product, whereas only negligible residues of the solvent used are retained in the green compacts obtained with the process according to the invention.

Preferably, the green compact obtained is subjected to a relaxation step after cooling and stretching. After such treatment the green compact retains its shape when heated. Such a relaxation step may consist in heating the green compact, for example under pressure, to above the melting temperature of the binder for between 5 and 20 minutes and then cooling it, also under pressure. Such a treatment can be very well combined with the lamination step in the production of laminates.

It may be advantageous to subject the green compact to irradiation, in particular electron irradiation, before, during or after stretching, which results in products with reduced creep. Moreover, it appears to be possible to greatly shorten or even entirely omit the aforementioned relaxation step after such irradiation.

In the process according to the invention varying draw ratios may be used. Moreover, the green compact may be stretched both biaxially and uniaxially. In the case of uniaxial stretching the draw ratio will usually be more than $5\times$, whereas in the case of biaxial stretching the green compact will be stretched at least $1.5\times$ in longitudinal and transverse direction, preferably between 3 and $15\times$. It is possible to use the same draw ratio in longitudinal and transverse direction or to use a higher draw ratio in longitudinal direction than in transverse direction or the other way round. Longitudinal and transverse stretching may be alternated, but are preferably done simultaneously, for example in a simultaneous biaxial stretching unit. The advantage of stretching in a simultaneous biaxial stretching unit is that the film being stretched is clamped along its edges, which means that the film surface is free from equipment surfaces, whereas stretching done with rolls may easily cause tear formation or an uneven thickness due to irregularities in the surface of the rolls or due to the occurrence of relatively large inorganic dust particles.

The present process is based on the use of combinations of a high-molecular polymer and a solvent, which combinations form thermoreversible systems. Polyvinyl alcohol or high-molecular linear polyalkenes, such as polyethylene, polypropylene and/or mixtures or copolymers hereof are suitable for use as polymer. The polymers may contain the usual additives such as stabilizers, colourants, pigments, etc.

Extremely suitable are solutions of linear polyethylene with a weight average molecular weight of at least $4\times10^5$ g/mole, preferably of at least $8\times10^5$ g/mole. High-molecular linear polyethylene is understood to be polyethylene that may contain minor amounts, preferably at most 5 mol. %, of one or more copolymerised other alkenes such as propylene, butylene, pentene, hexene, 4-methylpentene, octene, etc. The polyethylene may contain minor amounts, for example at most 25 wt. %, of one or more other polymers, in particular an alkene-1-polymer such as polypropylene, polybutylene or a copolymer of propylene and a minor amount of ethylene.

Preferably, use is made of a polymer with a narrow molecular weight distribution, for example with a weight average molecular weight and number average molecular weight ratio of less than 10, preferably 5. The advantage that can thus be obtained is that a relatively larger amount of solvent may be used at the same average molecular weight. The weight average molecular weight can be determined according to known methods by gel permeation chromatography and light scattering.

The concentration of polymer in the solution may vary, dependent in part on the nature of the solvent and the molecular weight of the polymer.

Solutions with a polymer concentration of more than 60 wt. %, relative to the amount of polymer plus solvent, are rather difficult to handle on account of their high viscosity, in particular when use is made of polymer with a very high molecular weight, for example of more than $1\times10^6$ g/mole In general, use will therefore be made of a polyalkene solution with a concentration of between 0.5 and 40 wt. %, in particular of between 2 and 20 wt. %.

The conversion of the solution into a green compact can be effected in various manners, for example by extrusion via a spinneret or a flat-sheet or plate die. Of course, it is also possible to cast the solution onto, for example, a tape or roll, roll or calender it. In the preparation of films and the like the solution is preferably cast onto a tape or the like if the polymer concentration is fairly low, whereas it is preferably extruded directly in the case of a high concentration.

In the case of spinning for example, the temperature of the solution is preferably at least 100° C. and more in particular at least 120° C., and the boiling point of the solvent is preferably at least 100° C. and in particular at least the same as the conversion or spinning temperature. The boiling point of the solvent must not be so high that it becomes difficult to evaporate it from the intermediates obtained because in that case an extraction step will be required.

The conversion temperature and the dissolution temperature must not be so high as to cause substantial thermal decomposition of the polymer. For this reason these temperatures will usually be chosen below 240° C.

The product obtained is cooled to below the gelling point of the solution. This can be effected in any suitable manner, for example by passing the product through a liquid bath or through a chimney. When cooled to below the gel point of the polymer solution, the polymer forms a gel. An object consisting of this polymer gel has sufficient mechanical strength to be processed further, for example via the commonly used conveyors, rolls, etc.

The gel thus obtained is then stretched. This gel may still contain substantial amounts of solvent, up to amounts that are hardly lower than those contained in the original polymer solution. It is also possible to remove a portion of the solvent, or even substantially all of the solvent, from the gel before the stretching, for example by evaporation or by washing it out with an extracting liquid.

The possibility of varying the amount of solvent present after gelling without affecting the essence of the stretchability leads to great flexibility in the control of the characteristics of the end product. Preferably, use is made of more than 10 wt. % solvent relative to the total weight of polymer and solvent. The green compact obtained in this manner is characterized by better mechanical properties, such as lower porosity, good workability and a modulus of elasticity of >0.5 GPa.

It is also possible to use the amount of solvent still present during stretching to control the porosity of the end product, in particular if use is made of a solvent that is removed after the stretching step. By using a solvent that can be removed during stretching different effects can be combined.

Preferably, the gels are stretched at elevated temperature, in particular at a temperature of over 75° C. The gels can be brought to the stretching temperature by passing them through a zone with a gaseous or liquid medium that is maintained at the required temperature. A chimney with air as gaseous medium is very suitable but it is also possible to use a liquid bath or any other suitable device.

In stretching, (any) residual solvent will be separated from the product. Preferably, this is stimulated with the aid of suitable methods, for example by removing the solvent vapour by passing a hot gas or air stream over the product in the stretching zone or by stretching in a liquid bath containing a medium that extracts the solvent. The green compact ultimately obtained must be free of solvent and the conditions are with advantage chosen so that this state is already reached, or is at least virtually reached, in the stretching zone.

The density of the green compact ($\rho_{exp}$) is determined by dividing the weight of a specimen by the total macroscopic volume as obtained, for example, via length $\times$ width $\times$ thickness. The theoretical maximum density ($\rho_{theor}$) is determined from the known densities of the individual constituent components. The total porosity (%) of the green compact follows from the ratio of the theoretical and the experimental density: porosity=(-$\rho_{exp}/\rho_{theor}$)$\times$100%.

Mechanical properties are determined from stress/strain curves obtained at room temperature with the aid of a tensile strength tester Specimens measuring 15$\times$170 mm are stretched at a speed of 100%/minute. The modulus (E) follows from the maximum of the first derivative of the stress/strain curve. Both the modulus and the tensile strength (T) are relative to the original cross-sectional area of the samples; the material properties are calculated by multiplying by a factor of 100/(100-porosity). The elongation at break is defined as the elongated length at the point of rupture divided by the initial length.

The invention is further illustrated with the aid of the following examples without, however, being limited thereto.

The concentration of inorganic substance given in Tables 2 through 5 is the filler content w, calculated according to formula (1). The concentration $\phi$ was calculated as the polymer/ polymer plus solvent volumetric ratio.

EXAMPLE 1

10 parts by volume of polyethylene ($M_w \sim 2\times 10^6$ g/mole) were added to 30 parts by volume of Decalin, after which the suspension obtained was degassed in a vacuum oven. Then 30 parts by volume of $Al_2O_3$ (and a small amount of surfactant) were added to 60 parts by volume of Decalin and the suspension obtained was ground in a pebble mill for 72 hours. After degassing and grinding the aforementioned suspensions were mixed in a 1:1 ratio so that finally a suspension was obtained with a polymer:solvent:$Al_2O_3$ volumetric ratio of 10:90:30 (p:s:i). The suspension obtained was fed to a twin screw extruder equipped with a spinning pump, a Sulzer mixer and a flat-sheet die and was processed at about 170° C. After extrusion the film obtained was quenched in water and partially dried. Then the film obtained was biaxially stretched at 125° C. and a draw ratio of 10$\times$10 and was heated to 170° C. for 7 minutes in a press, at a pressure of about 100 kg/cm$^2$. The film obtained was about 15 $\mu$m thick.

EXAMPLE 2

The process of example 1 was repeated, but the molecular weight, the concentration of the polymer in the solvent and the total amount of inorganic substance were varied according to the data shown in Table 2. In tests a and b polyethylene with a relatively low molecular weight was used. The films obtained could not be stretched homogeneously. The maximum biaxial draw ratio was low.

TABLE 2

| No | Mw (g/mole) | suspension p:s:i | θ [—] | w [—] | $\lambda_{biax}$ [—] | thickness [μm] |
|---|---|---|---|---|---|---|
| 1) | 8.3 $\times$ 10$^5$ | 35:65:30 | 0.35 | 0.46 | 5 $\times$ 5 | 24 |
| 2) | 8.3 $\times$ 10$^5$ | 35:65:30 | 0.35 | 0.46 | 10 $\times$ 10 | 8 |
| 3) | 8.3 $\times$ 10$^5$ | 15:81:20 | 0.15 | 0.57 | 5 $\times$ 5 | 13 |
| 4) | 8.3 $\times$ 10$^5$ | 15:81:20 | 0.15 | 0.57 | 10 $\times$ 10 | 6 |
| 5) | 2 $\times$ 10$^6$ | 20:80:20 | 0.20 | 0.50 | 5 $\times$ 5 | 12 |
| 6) | 2 $\times$ 10$^6$ | 20:80:20 | 0.20 | 0.50 | 10 $\times$ 10 | 4 |
| 7) | 2 $\times$ 10$^6$ | 10:90:30 | 0.10 | 0.75 | 5 $\times$ 5 | 14 |
| 8) | 2 $\times$ 10$^6$ | 5:95:20 | 0.05 | 0.80 | 5 $\times$ 5 | 8 |
| 9) | 5 $\times$ 10$^6$ | 10:90:20 | 0.10 | 0.67 | 5 $\times$ 5 | 10 |
| a) | 2 $\times$ 10$^5$ | 50:50:30 | 0.50 | 0.375 | — | — |
| b) | 2 $\times$ 10$^5$ | 30:70:30 | 0.30 | 0.50 | — | — |

EXAMPLE 3

Suspensions were prepared in the same manner as in example 1. The suspension was heated with stirring to 160° C. in an erlenmeyer flask in a silicone bath. The stirring was stopped after the Weisenberg effect. After having been maintained at 160° C. for about 2 hours, the polyethylene solution containing the suspended inorganic filler was poured into an aluminium dish. After the complete or partial evaporation of the solvent a filled film was obtained, which was stretched and relaxed in the same manner as in example 1. The data relative to the filler content of the polymer, the concentration of polymer in the solvent and the inorganic substance content were varied as shown in Table 3. Experiments a and b refer to polyethylene with a relatively low molecular weight. The films obtained were brittle.

TABLE 3

| No | Mw (g/mole) | suspension p:s:i | θ [—] | w [inorg.] | $\lambda_{biax}$ [—] | thickness [μm] |
|---|---|---|---|---|---|---|
| a) | 2 $\times$ 10$^5$ | 10:90:30 | 0.10 | 0.75 | — | — |
| b) | 3 $\times$ 10$^5$ | 10:90:30 | 0.10 | 0.75 | — | — |
| 1) | 2 $\times$ 10$^6$ | 2:48:20 | 0.04 | 0.91 | 10 $\times$ 10 | 9 |
| 2) | 5 $\times$ 10$^6$ | 2:98:20 | 0.02 | 0.91 | 10 $\times$ 10 | 6 |
| 3) | 5 $\times$ 10$^6$ | 1:99:20 | 0.01 | 0.95 | 10 $\times$ 10 | 8 |

EXAMPLE 4

Films were prepared according to example 3. The films were stretched both biaxially and uniaxially. Uniaxial stretching was done with the aid of a shoe, at 130° C. The draw ratio was determined with the aid of marks. Biaxial stretching was done according to example 1. The concentration of polymer in solvent, the filler content and the draw ratio (biaxal and uniaxial) were varied while the molecular weight of the polymer remained unchanged. Table 4 shows the maximum uniaxial draw ratio ($\lambda_{uniax}$) at different filler contents. $\lambda_{uniax}$ appeared to decrease considerably at high filler contents. At all filler contents a minimum biaxial draw ratio of 10×10 appeared feasible. The maximum possible biaxial draw ratio could not be determined due to equipment limitations.

TABLE 4

| No | Mw (g/mole) | suspension p:s:i | θ [—] | w [—] | $\lambda_{uniax}$ [—] | $\lambda_{biax}$ [—] |
|---|---|---|---|---|---|---|
| 1) | 2 × 10$^6$ | 2:98:0 | 0.02 | 0 | 110 | 10 × 10 |
| 2) | 2 × 10$^6$ | 2:98:0.2 | 0.02 | 0.10 | 120 | 10 × 10 |
| 3) | 2 × 10$^6$ | 2:98:0.5 | 0.02 | 0.20 | 105 | 10 × 10 |
| 4) | 2 × 10$^6$ | 2:98:1 | 0.02 | 0.35 | 90 | 10 × 10 |
| 5) | 2 × 10$^6$ | 2:98:2 | 0.02 | 0.50 | 50 | 10 × 10 |
| 6) | 2 × 10$^6$ | 2:98:4.7 | 0.02 | 0.70 | 14 | 10 × 10 |

EXAMPLE 5

Polypropylene was processed in the same manner as in example 1. The data are shown in Table 5.

TABLE 5

| No | Mw (g/mole) | suspension p:s:i | θ [—] | w [—] | $\lambda_{biax}$ [—] | thickness [μm] |
|---|---|---|---|---|---|---|
| 1) | 1.5 × 10$^6$ | 10:90:20 | 0.10 | 0.67 | 5 × 5 | 13 |
| 2) | 1.5 × 10$^6$ | 5:95:30 | 0.05 | 0.86 | 5 × 5 | 8 |

EXAMPLE 6

The process of example 1 was repeated, on the understanding that use was made of barium titanate powder and that no relaxation step was carried out. The amounts were adjusted so that finally a suspension was obtained with a polymer:solvent:barium titanate ratio of 10:90:11 (p:s:i). Parts of the film obtained were partly dried at room temperature for varying lengths of time, after which they were biaxially stretched at a draw ratio of 4×4. The amount of solvent still present at the beginning of the stretching procedure was determined gravimetrically.

The mechanical properties and porosities of the resulting green compacts were compared The green compacts obtained in tests 5 and 6 appeared to be self-supporting, but difficult to handle, due largely to their great sensitivity to electrostatic charging. The results are shown in Table 6. These results show, among other things, that the porosity can be varied within wide limits.

TABLE 6

| Test No. | [Dec]* % | elongation at break % | E GPa | T GPa | Porosity % |
|---|---|---|---|---|---|
| 1 | 38 | >100 | 0.80 | 0.06 | 43 |
| 2 | 29 | >100 | 1.10 | 0.06 | 52 |
| 3 | 20 | 60 | 0.62 | 0.06 | 74 |
| 4 | 10 | 30 | 0.56 | 0.07 | 80 |
| 5 | 1 | 30 | 0.34 | 0.05 | 82 |
| 6 | 0 | 30 | 0.22 | 0.04 | 86 |

[Dec] is the weight percentage of decalin at the beginning of the stretching procedure, calculated on the basis of the total amount of polymer plus solvent.

EXAMPLE 7

Polyethylene ($M_w \approx 2.0 \times 10^6$ g/mole), decalin and barium titanate (Type X7R302H of TAM®, Buffalo, N.Y., USA) were used to prepare suspensions according to the process of example 1, with p:s:i volumetric ratios of 10:90:15.3 and 10:90:23.5, which suspensions were extruded to obtain films. The films were biaxially stretched into 20-μm thick films, at a draw ratio of 4.5×4.5. Ten layers of the stretched film were placed on top of each other and compressed for 30 minutes at 180° C. and a pressure of 10 MPa. The compressed laminates were subsequently fired at 550° C., in a nitrogen atmosphere, and sintered for 2 hours at 1300° C. No bending or non uniform shape changes where observed upon binder burn-out and firing. After each of the described steps the density of the samples was determined as a percentage of the density of the barium titanate. The results are given in Table 7.

TABLE 7

| | | | density/5.89 × 100% | | | |
|---|---|---|---|---|---|---|
| sample | p:s:i | vol. % | green compact | after compression | after firing | after sintering |
| 1 | 10:90:16.3 | 60 | 33 | 59 | 61 | 96 |
| 2 | 10:90:16.3 | 60 | 34 | 52 | 52 | 96 |
| 3 | 10:90:23.5 | 70 | 41 | 57 | 67 | 99 |

The relative dielectric constant of sample 3, determined at 25° C. and 1 kHz, was 3300, which agrees with the value specified by the supplier for the starting material.

EXAMPLE 8

The process of example 1 was repeated, but instead of Al$_2$O$_3$ use was made of barium titanate in a p:s:i volumetric ratio of 10:90:11. Samples of the film obtained were subjected to biaxial stretching either immediately, that is, without drying, or after drying, in which cases the decalin content was 37 wt. % and <4 wt. %, respectively. After stretching, the samples were compressed as in example 1. The results are summarized in Table 8.

TABLE 8

| | before compression | | | | | | after compression | |
|---|---|---|---|---|---|---|---|---|
| | | | modulus of | | | | | |
| draw ratio | elongation at break % | tensile strength GPa | elasticity GPa | dens. g/ml | thickness μm | poros. % | thickness μm | poros. % |
| not dried: | | | | | | | | |
| 3*3 | 201 | 0.041 | 0.71 | 2.29 | 45 | 40 | 29 | 5 |
| 3*4 | 240 | 0.052 | 0.70 | 1.98 | 33 | 48 | 19 | 6 |
| 3*4.5 | 200 | 0.060 | 0.90 | 2.18 | 30 | 43 | 18 | 4 |
| dried: | | | | | | | | |

TABLE 8-continued

| | before compression | | | | | | after compression | |
|---|---|---|---|---|---|---|---|---|
| draw ratio | elongation at break % | tensile strength GPa | modulus of elasticity GPa | dens. g/ml | thickness μm | poros. % | thickness μm | poros. % |
| 5.5*5.5 | 31 | 0.036 | 0.21 | 0.53 | 84 | 86 | 24 | 15 |

We claim:

1. A self-supporting green film that is less than 25 μm thick comprising:
   an inorganic substance; and
   a binder consisting substantially of a polyolefin, polyvinyl alcohol or polyacrlonitrile with a weight average molecular weight of more than 400,000, the green film being obtained by biaxially stretching the polymer which is obtained from a thermoreversible gel of the polymer and a suitable solvent by removing the solvent from the gel, the volume fraction of inorganic substance being more than 45% relative to the total amount of binder plus inorganic substance.

2. A green film according to claim 1, wherein the volume fraction of inorganic substance is less than or equals $0.6/(0.6+M_{emelt}/M_n)$, $M_{emelt}$ being the molecular weight of the polymer between two cross-links in the equilibrium melt and $M_n$ being the number average molecular weight of the polymer.

3. A green film according to claim 1, wherein the porosity is less than 80%.

4. A green film according to claim 1, wherein the modulus exceeds 0.5 GPa.

5. A green film according to claim 1, wherein a ratio of the weight average molecular weight of the polymer and the number average molecular weight of the polymer is less than 10.

6. A green film according to claim 1, wherein the inorganic substance is sinterable.

7. A green film according to claim 1, wherein the volume fraction of inorganic substance is 50 to 99% relative to the total amount of binder plus inorganic substance.

8. A green film according to claim 1, wherein the volume fraction of inorganic substance is 50 to 99% relative to the total amount of binder plus inorganic substance.

9. A method of using green film according to claim 1 for the application in objects of layers containing inorganic substance.

10. Process for the preparation of thin-walled inorganic green film comprising the steps of:
    dissolving a binder into a suitable solvent, the binder having a weight average molecular weight of more than $4 \times 10^5$, the concentration of the binder being less than 60 wt. % relative to the binder plus solvent;
    adding an inorganic substance in an amount of more than 45 vol. % relative to the total volume of the binder plus inorganic substance to form a mixture;
    converting the mixture into a solvent-containing intermediate at a temperature above the gelling temperature of the mixture;
    rapidly cooling the intermediate to below the gelling temperature of the mixture to form a gel; and
    stretching the gel biaxially.

11. Process according to claim 10, wherein a volatile solvent is used.

12. Process according to claim 10, characterized in that the green film is stretched biaxially.

13. Process according to claim 10, wherein when the stretching is started the green film still contains at least 10 wt. % solvent, relative to the total amount of solvent plus binder.

14. Process according to claim 10, wherein the green film obtained is subjected to a relaxation step.

15. Process for the preparation of thin-walled inorganic green film comprising the steps of:
    dissolving a binder into a suitable solvent, the binder having a weight average molecular weight of more than $4 \times 10^5$, the concentration of the binder being less than 60 wt. % relative to the binder plus solvent;
    adding an inorganic substance in an amount of more than 45 vol. % relative to the total volume of the binder plus inorganic substance to form a mixture;
    converting the mixture into a solvent-containing intermediate at a temperature above the gelling temperature of the mixture;
    rapidly cooling the intermediate to below the gelling temperature of the mixture to form a gel;
    biaxially stretching the gel; and
    relaxing the gel.

16. Process for the preparation of thin-walled inorganic green film comprising the steps of:
    dissolving a binder into a suitable solvent, the binder consisting substantially of a polyolefin having a weight average molecular weight of more than $4 \times 10^5$, the concentration of the binder being less than 60 wt. % relative to the binder plus solvent;
    adding an inorganic substance in an amount of more than 45 vol. % relative to the total volume of the binder plus inorganic substance to form a mixture;
    converting the mixture into a solvent-containing intermediate at a temperature above the gelling temperature of the mixture;
    rapidly cooling the intermediate to below the gelling temperature of the mixture to form a gel; and
    biaxially stretching the gel.

17. Process according to claim 16, wherein a volatile solvent is used.

18. Process according to claim 16, wherein when the stretching is started the green film still contains at least 10 wt. % solvent, relative to the total amount of solvent plus binder.

19. Process according to claim 16, wherein the green film obtained is subjected to a relaxation step.

20. A green film according to claim 1, wherein a density of a material obtained after compressing and firing the green film is between 52 and 67% of the density of the inorganic material.

* * * * *

UNITED STATES PATENT AND TRADEMARK OFFICE
CERTIFICATE OF CORRECTION

PATENT NO. : 5,268,415
DATED : December 7, 1993
INVENTOR(S) : PIETERSE ET AL

It is certified that error appears in the above-indentified patent and that said Letters Patent is hereby corrected as shown below:

In column 2, line 57: '... $SiO_2$, $\underline{O}_3$, $BaTiO_3$...' should read '... $SiO_2$, $\underline{Al_2O_3}$, $BaTiO_3$...'.

In column 4, line 14, formula (1) should read:
'$\underline{w} = V_i$ ....'

Signed and Sealed this

Twenty-first Day of June, 1994

Attest:

BRUCE LEHMAN

*Attesting Officer*     Commissioner of Patents and Trademarks